(12) United States Patent
Earnhardt, Jr.

(10) Patent No.: US 10,791,477 B1
(45) Date of Patent: Sep. 29, 2020

(54) DATALINK ACQUISITION AND LINK MAINTENANCE USING SOFTWARE-DEFINED RADIO MULTICHANNEL RECEIVERS

(71) Applicant: Rockwell Collins, Inc., Cedar Rapids, IA (US)

(72) Inventor: Neil J. Earnhardt, Jr., Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 284 days.

(21) Appl. No.: 15/446,916

(22) Filed: Mar. 1, 2017

(51) Int. Cl.
*H04W 28/02* (2009.01)
*H04L 5/02* (2006.01)

(52) U.S. Cl.
CPC ......... *H04W 28/0236* (2013.01); *H04L 5/023* (2013.01)

(58) Field of Classification Search
USPC .................................. 370/331, 328, 332, 329
See application file for complete search history.

(56) References Cited

U.S. PATENT DOCUMENTS

| | | | | |
|---|---|---|---|---|
| 5,212,804 A | * | 5/1993 | Choate | H04B 7/185 455/431 |
| 8,145,208 B2 | * | 3/2012 | Chari | H01Q 1/283 455/431 |
| 8,744,439 B2 | * | 6/2014 | Deivasigamani | H04W 48/20 455/434 |
| 9,986,492 B2 | * | 5/2018 | Katar | H04W 48/16 |
| 10,075,230 B2 | * | 9/2018 | Ohm | H04B 7/0608 |
| 2008/0075035 A1 | * | 3/2008 | Eichenberger | H04W 36/08 370/328 |
| 2012/0231788 A1 | * | 9/2012 | Kaminski | H01Q 1/526 455/431 |

* cited by examiner

*Primary Examiner* — Phuongchau Ba Nguyen
(74) *Attorney, Agent, or Firm* — Suiter Swantz pc llo

(57) ABSTRACT

Embodiments of the inventive concepts disclosed herein are directed to systems and methods for data link acquisition using multichannel transceivers. A first transceiver may scan a first set of frequencies for a first signal at a first frequency from a first ground station. A second transceiver may scan a second set of frequencies for a second signal at a second frequency from a second ground station. The second set may be higher than the first set. A controller of the avionics radio device may be communicatively coupled to the first transceiver and the second transceiver. The controller may compare the first signal quality of the first signal with the second signal quality of the second signal. The controller may commence a data link with the first ground station or the second ground station via one of the first and second transceivers of the avionics radio device based on the comparison.

20 Claims, 3 Drawing Sheets

DATALINK ACQUISITION AND LINK MAINTENANCE USING SOFTWARE-DEFINED RADIO MULTICHANNEL RECEIVERS

BACKGROUND

Current avionics radio devices may operate in Voice Mode or High Frequency (HF) Data Link for transmitting and receiving messages pursuant to the Aircraft Communications Address and Reporting System (ACARS) protocol. Upon powering on, such radio devices may enter a search of a best frequency table to find a ground station to log onto. Scanning each of the frequencies listed in the best frequency table for a message (e.g., pulse messages) from any ground station may take up to 26 minutes. If no signals are found at any of the frequencies listed in the best frequency table, the avionics radio device may start searching for all possible ground station frequencies. This process may additionally consume 80 minutes. Again, if no signals are found at any of the frequencies for all possible ground stations, the radio device may then search the entire frequency band for the message, taking up an additional 4.75 hours. Having logged onto the radio device, the avionics radio device may continue to operate until the connection between the radio device and the ground station degrades, resulting in the dropping of the data link. The radio device may repeat the process of searching for signals from another ground station at the frequencies listed in the best frequency table, then all the possible ground station frequencies, and then the entire frequency band. Multiple repetitions of this process of searching for a signal may consume an excessive amount of time. In addition, dropped links may lead to loss of conformance with the Required Communication Performance (RCP) for air traffic management. Therefore, an efficient and effective way to scan and update the best frequency table would be beneficial.

SUMMARY

In one aspect, and in accordance with the inventive concepts disclosed herein, embodiments of the inventive concepts disclosed herein are directed to a system for data link acquisition using multichannel transceiver channels. A first transceiver of an avionics radio device having one or more processors may scan a first set of frequencies for a first signal at a first frequency from a first ground station. The first signal may be received via an antenna of the avionics radio device and may have a first signal quality. A second transceiver of the avionics radio device may scan a second set of frequencies for a second signal at a second frequency from a second ground station. The second signal may be received via the antenna and may have a second signal quality. The second set of frequencies may be higher than the first set of frequencies. A controller of the avionics radio device may be communicatively coupled to the first transceiver and the second transceiver. The controller may compare the first signal quality of the first signal at the first frequency with the second signal quality of the second signal at the second frequency. The controller may commence a data link with the first ground station or the second ground station via a first one of the first and second transceivers of the avionics radio device based on the comparison between the first signal quality of the first signal and the second signal quality of the second signal.

In some embodiments, and in accordance with the inventive concepts disclosed herein, the controller may further update, during the scanning by the first and second transceivers, a list of signals from a plurality of ground stations comprising the first and second ground stations, from which a signal with the highest level of signal quality from the scanning is identified. In some embodiments, and in accordance with the inventive concepts disclosed herein, the controller may determine, subsequent to the commencement of the data link with the first ground station, that the first signal quality has degraded to a level below a predetermined threshold. In some embodiments, and in accordance with the inventive concepts disclosed herein, the controller may terminate, responsive to the determination that the first signal quality has degraded to a level below the predetermined threshold, the data link with the first ground station.

In some embodiments, and in accordance with the inventive concepts disclosed herein, the first transceiver may scan each frequency of the first set of frequencies for a predetermined time window. The predetermined time window may be greater than a first transmission time window of the first signal from the first ground station or a second transmission time window of the second signal from the second ground station. In some embodiments, and in accordance with the inventive concepts disclosed herein, the second transceiver may scan each frequency of the second set of frequencies for the predetermined time window.

In some embodiments, and in accordance with the inventive concepts disclosed herein, the controller may decode the first signal to determine the first signal quality and decode the second signal to determine the second signal quality. In some embodiments, and in accordance with the inventive concepts disclosed herein, the controller may commence the data link in a first communications protocol via a third transceiver of the radio device. In some embodiments, and in accordance with the inventive concepts disclosed herein, the controller may maintain a second data link in a second communications protocol via a fourth transceiver of the radio device.

In some embodiments, and in accordance with the inventive concepts disclosed herein, subsequent to the commencement of the data link with the first ground station, a second one of the first and second transceivers may scan the first set of frequencies, the second set of frequencies or a third set of frequencies for a third signal from one of a plurality of ground stations comprising the first and second ground stations. The third signal may be received via the antenna and may have a third signal quality. In some embodiments, and in accordance with the inventive concepts disclosed herein, the system may further include a third transceiver of the avionics radio device. The third transceiver may maintain, during the scanning by the first and second transceivers, a voice communications link with one of a plurality of ground stations comprising the first and second ground stations, via the antenna.

In a further aspect, and in accordance with the inventive concepts disclosed herein, embodiments of the inventive concepts disclosed herein are directed to an avionics radio device for data link acquisition using multichannel transceiver channels. A first transceiver may scan a first set of frequencies for a first signal at a first frequency from a first ground station. The first signal may be received via an antenna of the radio device and may have a first signal quality. A second transceiver may scan a second set of frequencies for a second signal at a second frequency from a second ground station. The second signal may be received via the antenna and have a second signal quality. The second set of frequencies may be higher than the first set of frequencies. A controller may be communicatively coupled to the first transceiver and the second transceiver. The controller may compare the first signal quality of the first signal at the first frequency with the second signal quality of the second signal at the second frequency. The controller may commence a data link with the first ground station or the second ground station via a first one of the first and second transceivers of the avionics radio device based on the comparison between the first signal quality of the first signal and the second signal quality of the second signal.

In a further aspect, and in accordance with the inventive concepts disclosed herein, embodiments of the inventive concepts disclosed herein are directed to a method of data link acquisition using multichannel transceiver channels. A first transceiver of an avionics radio device having one or more processors may scan a first set of frequencies for a first signal at a first frequency from a first ground station. The first signal may be received via an antenna of the radio device and may have a first signal quality. A second transceiver of the avionics radio device may scan a second set of frequencies for a second signal at a second frequency from a second ground station. The second signal may be received via the antenna and may have a second signal quality. The second set of frequencies may be higher than the first set of frequencies. A controller may compare the first signal quality of the first signal at the first frequency with the second signal quality of the second signal at the second frequency. The controller may commence a data link with the first ground station or the second ground station via a first one of the first and second transceivers of the avionics radio device based on the comparison between the first signal quality of the first signal and the second signal quality of the second signal.

In some embodiments, and in accordance with the inventive concepts disclosed herein, the controller may update the first set of frequencies to include the second frequency responsive to a determination that the first signal quality is greater than the second signal quality. In some embodiments, the controller may determine, subsequent to the commencement of the data link with the first ground station, that the first signal quality has degraded to a level below a predetermined threshold. In some embodiments, the controller may terminate, responsive to the determination that the first signal quality has degraded to a level below the predetermined threshold, the data link with the first ground station.

In some embodiments, and in accordance with the inventive concepts disclosed herein, the controller may commence, responsive to the determination that the first signal quality has degraded to a level below that of the second signal quality, an authentication process with the second ground station. In some embodiments, the first transceiver may scan each frequency of the first set of frequencies for a predetermined time window. The predetermined time window may be greater than a first transmission time window of the first signal from the first ground station or a second transmission time window of the second signal from the second ground station. In some embodiments, the second transceiver may scan each frequency of the second set of frequencies for the predetermined time window.

In some embodiments, and in accordance with the inventive concepts disclosed herein, the controller may decode the first signal to determine the first signal quality. In some embodiments, the controller may decode the second signal to determine the second signal quality. In some embodiments, the controller may commence the data link in a first communications protocol via a third transceiver of the radio device. In some embodiments, the controller may maintain a second data link in a second communications protocol via a fourth transceiver of the radio device.

In some embodiments, and in accordance with the inventive concepts disclosed herein, one of the first or the second transceivers may, subsequent to the commencement of the data link with the first ground station, scan the first set of frequencies, the second set of frequencies or a third set of frequencies, for a third signal from one of a plurality of ground stations comprising the first and second ground stations. The third signal may be received via the antenna and may have a third signal quality. In some embodiments, a third transceiver of the avionics radio device may maintain, during the scanning by the first and second transceivers, a voice communications link with one of a plurality of ground stations comprising the first and second ground stations, via the antenna. In some embodiments, a fourth transceiver of the avionics radio device may maintain, during the scanning by the first and second transceivers, a second data link with a third ground station via the antenna.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
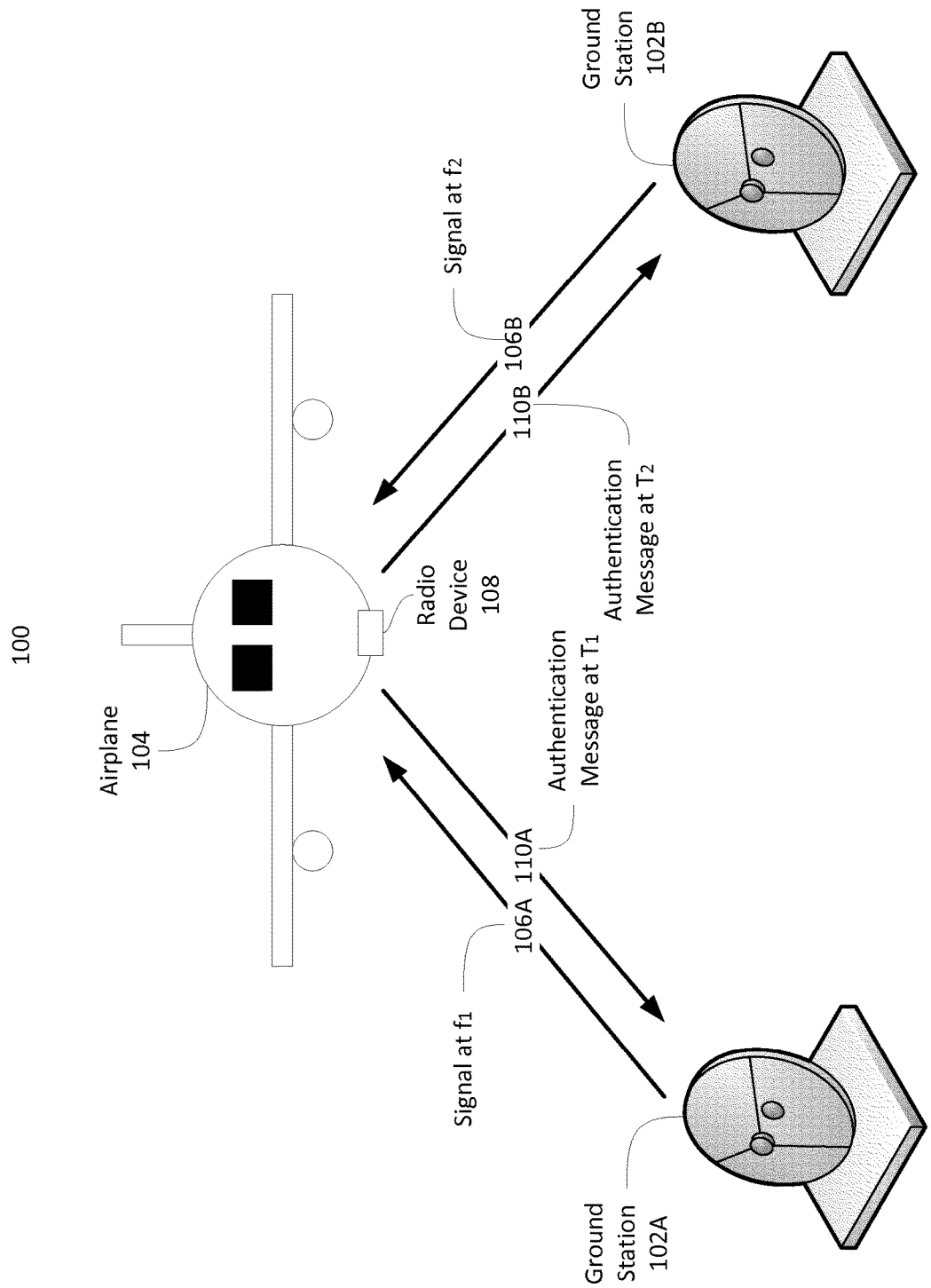
FIG. 1 is a block diagram of an example embodiment of an environment for data link acquisition using multichannel transceiver channels, in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to a system of data link acquisition using multichannel transceiver channels. In an avionics communication network, a radio device on an airplane may establish a communication session via log-in with a ground station. Prior to establishing the communication session, the radio device may search for signals from various ground stations arriving at the airplane. The signal may be in the form of a message with a certain duration or a pulse message (sometimes referred to as a "squitter") at a particular frequency and may identify the particular originating ground station. By using a software-defined radio (SDR) device, multiple frequency ranges may be scanned simultaneously. In some embodiments, the radio device may scan frequencies listed in a best frequency table (e.g., using a first receiver), frequencies listed in a larger table of frequencies (e.g., using a second receiver), and/or an entire band of frequencies (e.g., using a third receiver) for a signal from one of the ground stations, simultaneously. In this manner, the radio device may reduce the time consumed in searching for the signals from ground stations. If two or more signals are detected, the radio device may then use a signal processor to estimate a signal quality metric (e.g., signal-to-noise ratio, error rate, etc.) of the two signals and may compare the signal quality metrics. The radio device may then select the ground station corresponding to that with the highest signal quality metric. If the identified frequency is not on the best frequency table, the radio device may add the frequency thereto. With one of the receivers (such as a fourth receiver), the radio device may commence an authentication process (e.g., log-in) with the ground station to establish a data link between the radio device and the ground station.

After the data link is opened with the selected ground station using the fourth receiver for instance, the radio device may continue searching for signals from other ground stations using the other receivers in the manner described above. As the airplane travels away from the ground station, the signal quality of the data link may degrade. If the signal quality metric degrades to below a predefined threshold, the radio device may terminate the authentication or connection with the original ground station. The radio device may switch over to another ground station corresponding to that with the highest signal quality metric. The radio device may also initiate the authentication process, and may establish a data link with the newly selected ground station. In this manner, the radio device may transition the data link from one ground station to another ground station in a seamless fashion, avoiding delays in availability and latency performance.

Referring to FIG. 1, depicted is one embodiment of an environment 100 for data link acquisition using multichannel transceiver channels, in accordance with some embodiments of the inventive concepts disclosed herein. The environment 100 may include one or more ground stations 102A-N and an airplane 104. Each ground station 102A-N may be stationary or moving, and may transmit messages to an aircraft (e.g., airplane 104) to coordinate and manage flight traffic. As depicted in FIG. 1, a first ground station 102A may transmit a first signal 106A and a second ground station 102B may transmit a second signal 106B. Each of the first signal 106A and the second signal 106B may be sent at prefixed time intervals and may be at different frequencies (e.g., $f_1$ and $f_2$). Furthermore, each signal 106A and 106B may identify or be used to identify the originating ground station 102A or 102B. The airplane 104 may be any aircraft (e.g., a helicopter, propeller airplane, passenger airliner, fighter plane, dirigible balloon, etc.) with an on-board radio device 108 for communicating with other aircraft and ground stations 102A-N.

The radio device 108 on-board the airplane 104 may scan for the signals 106A and 106B from one or more ground stations 102A-102N. The on-board radio device 108 may be a software-defined radio (SDR) device with a transceiver front end, a signal processing unit, a controller, and an antenna. Within the transceiver front end, there may be a plurality of transceivers receiving input from the single antenna. Each transceiver of the on-board radio device 108 may scan at different frequency ranges. A first transceiver may scan frequencies listed on a best frequencies table for a signal 106A-106N from any of the ground stations 102A-102N. A second transceiver may scan frequencies of another set (e.g., a larger set) of frequencies for the signal 106A-106N. A third transceiver may scan frequencies in yet another set or an entire band of frequencies for the signal 106A-106N. The first signal 106A and the second signal 106B may lie on one of the frequencies scanned by the receivers of the on-board radio device 108.

Once signals 106A and 106B are detected, the on-board radio device 108 may use the signal processor to determine the signal quality metric for each signal 106A and 106B. The radio device 108 may compare the signal quality metric for the first signal 106A with the signal quality metric for the second signal 106B. At $T_1$, the signal quality metric or score for the first signal 106A originating from the first ground station 102A may be better or greater than the signal quality metric for the second signal 106B originating from the second ground station 102B. The radio device 108 may identify the first ground station 102A corresponding to the first signal 106A with the higher/better signal quality metric/score, and then establish a data link by sending an authentication message 110A to the first ground station 102A. The authentication message 110A may include identification of the airplane 104 and other parameters regarding the airplane 104. The data link between the first ground station 102A and the airplane 104 may be in accordance with data link protocol (e.g., high frequency data link (HFDL)) or the voice mode protocol, among others. After the establishment of the data link between the airplane 104 and the first ground station 102A, the receivers of the radio device 108 may continue to scan the frequencies.

Sometime later, at $T_2$, the data link between the airplane 104 and the first ground station 102A may degrade to a point where communications become unreliable or unacceptable. As the radio device 108 has continued to scan the frequencies for signals 106A-N, the radio device 108 may determine that now the signal quality metric for the second signal 106B originating from the ground station 102B is greater than the signal quality metric for the first signal 106A originating from the ground station 106A. In response to this determination, the radio device 108 may terminate the data link with the first ground station 102A and may initiate a data link with the second ground station 102B by sending the second authentication message 110B. As with the first authentication message 110A, the authentication message 110B may include identification of the airplane 104 and other parameters regarding the airplane 104. The data link between the second ground station 102B and the airplane 104 may be in accordance with the data link protocol (e.g., HFDL) or the voice mode protocol, among others. Although the above references two signals from two base stations, this is merely by way of illustration, and can be considered with one or more other signals from other base stations.

Figure 2:
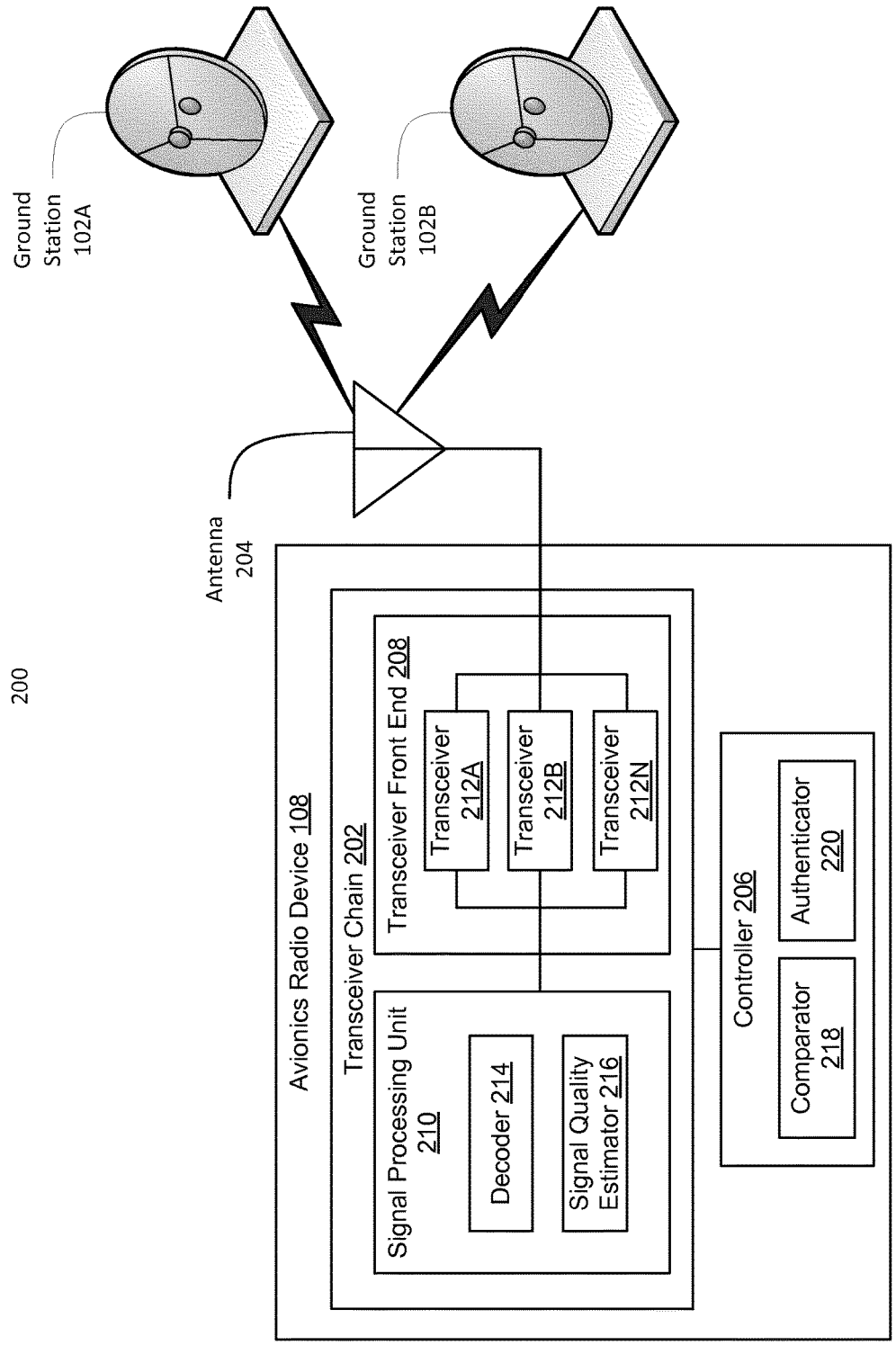
FIG. 2 shows a block diagram of an example embodiment of an architecture for data link acquisition using multichannel transceiver channels, in accordance with some embodiments of the inventive concepts disclosed herein.

Referring to FIG. 2, shown is an example architecture 200 for data link acquisition using multichannel transceiver channels, in accordance with some embodiments of the inventive concepts disclosed herein. The avionics radio device 108 may include a transceiver chain 202, an antenna 204, and a controller 206. The transceiver chain 202 may include a transceiver chain (or channel) of a software defined radio (SDR) device. The transceiver chain 202 of the avionics radio device 108 may include a transceiver front end 208 and a signal processing unit 210. The transceiver front end 208 may include one or more transceivers 212A-N. The signal processing unit 210 may include a decoder 214 and a signal quality estimator 216. The controller 206 may include a comparator 218 and an authenticator 220. The transceiver chain 202 and the controller 206 may be coupled to each other. In some embodiments, there may be multiple transceiver chains with similar functionality as the transceiver chain 202 within the radio device 108. The transceivers 212A-N and/or the transceiver chains may share one or more elements such as an antenna.

The ground station 102A-N may include one or more antennae for communicating with the avionics radio device 108 using one or more communications protocols. The one or more communications protocols may include avionics communications protocols, such as voice mode and High Frequency Data Link mode, among others. The ground station 102A-N may transmit signals 106A-N at periodic intervals. The signals 106A-N may be transmitted by the ground station 102A-N for a predefined transmission time window. The antenna of the ground station 102A-N and the antenna 204 may include or correspond to a half-wave dipole, a dipole antenna (e.g., corner reflector or log-periodic), a monopole antenna (e.g., whip, mast, umbrella, or inverted F) a travelling wave antenna (e.g., helical or spiral), reflector antenna (e.g., corner or parabolic), an aperture antenna (e.g., parabolic, slot, horn, or dielectric), a microstrip antenna, an array antenna, or a loop antenna, among others.

In further detail, the transceiver chain 202 may communicate via the antenna 204 of the avionics radio device 108 with the antenna of the ground station 102A-N using the one or more communications protocols. The transceiver chain 202 may transmit signals via the antenna 204 of the avionics radio device 108 to the antenna of the ground station 102A-N using one of the one or more communications protocols. Which one of the one or more communications protocols the transceiver chain 202 communicates, receives, or transmits signals in may be set, modified, or otherwise configured by the controller 206, as will be detailed further below. The transceiver chain 202 may transmit and receive signals via the antenna 204 to and from the antenna of the ground station 102A-N with the transceiver front end 208 and may process the signals with the signal processing unit 210.

The one or more transceivers 212A-N of the transceiver front end 208 may scan sets of frequencies for signals 106A-N originating from the ground stations 102A-N via the antenna 204. A first set of frequencies may be listed in a best frequencies table. A second set of frequencies may be all possible frequencies. A third set of frequencies may be from a wide band of frequencies. The second set of frequencies may be offset in frequency and/or greater in number than the first set of frequencies. The third set of frequencies may be offset in frequency and/or greater in number than both the first set of frequencies and the second set of frequencies. Each set of frequencies may be stored on memory at the avionics radio device 108. In some embodiments, a first transceiver 212A may scan the first set of frequencies for the first signal 106A at a first frequency (e.g., $f_1$). In some embodiments, a second transceiver 212B may scan the second set of frequencies for the second signal 106B at a second frequency (e.g., $f_2$). In some embodiments, a third transceiver 212C may scan the third set of frequencies for the third signal 106C at a third frequency (e.g., $f_3$). Each signal 106A-N may be received and processed by the transceiver front end 208 in accordance with the one or more communications protocols.

Each transceiver 212A-N may identify an aspect (e.g., an amplitude or signature) of the input at the frequency scanned and received from the antenna 204. Each transceiver 212A-N may compare the aspect of the input to a predefined threshold or value. For instance, the predefined threshold may correspond to a minimum expected amplitude of the signal 102A-N transmitted by the ground station 106A-N. If the aspect of the input is greater than or equal to the predefined threshold or matches a certain value, the transceiver 212A-N may determine that the input received from the antenna 204 at the scanned frequency corresponds to a signal 106A-N from the ground station 102A-N. In some embodiments, the scanning by each of the transceivers 212A-N may be for a predetermined time window. The predetermined time window of the scanning may be greater than the transmission time window for each signal 106A-N. By using multiple transceivers 212A-N to scan frequencies, the avionics radio device 108 may reduce the time consumed to search for the signals 106A-N emitted by the ground station 102A-N. If four transceivers 212A-D are used, the reduction in time may be as much as 66%.

To determine the signal quality of the received signals 102A-N, the decoder 214 of the signal processing unit 210 may for instance decode each received signal 106A-N. In some embodiments, the decoder 214 may perform an analog-to-digital (A/D) conversion to sample the received signal 106A-N and to convert the received signal 106A-N from analog form to digital form. The decoder 214 may decrypt or decode the received signal 106A-N in accordance with the one or more communications protocols. In some embodiments, the decoder 214 may identify a binary sequence for the received signal 106A-N. The binary sequence may be particular to the one or more communications protocols. Using the decoded signal 106A-N, the signal quality estimator 216 may estimate a signal quality metric for each signal 106A-N. The signal quality metric may include signal-to-noise ratio (SNR), signal power, amplitude, and bit error rate, among others. In some embodiments, the signal quality estimator 216 may calculate the signal-to-noise ratio using blind SNR estimation techniques. In some embodiments, the signal quality estimator 216 may decompose the received signal 106A-N into noise and signal components and calculate the SNR based on the identified noise and the signal components. In some embodiments, the signal quality estimator 216 may identify the power of the received signal 106A-N within a predefined sampling window. In some embodiments, the signal quality estimator 216 may identify a maximum amplitude of the received 106A-N. In some embodiments, the signal quality estimator 216 may identify the binary sequence corresponding to the signal 106A-N and may identify errors from the binary sequence to estimate the bit error rate. The signal quality estimator 216 may use any number of techniques in determining the signal quality metric.

The comparator 218 of the controller 206 may compare the signal quality of each signal 106A-N with the signal quality of another signal 106A-N. In some embodiments, the comparator 218 may determine that the signal quality for the first signal 106A is greater than or less than the signal quality for the second signal 106B. In some embodiments, the comparator 218 may identify the signal 106A-N corresponding to the highest signal quality. Based on the comparison, the comparator 218 may identify the ground station 102A-N corresponding to the signal 106A-N with the highest signal quality. In some embodiments, the comparator 218 may identify the ground station 102A-N based on identifying information of the received signal 106A-N. In the context of FIG. 1, if the comparator 218 determines that the first signal 106A as having the highest signal quality, the comparator 218 may identify the first ground station 102A corresponding to the origin of the first signal 106A as associated with the first signal 106A.

Referring back to FIG. 2, once the ground station 102A-N corresponding to the signal 106A-N with the highest signal quality is identified, the authenticator 220 may commence a data link with the corresponding ground station 102A-N. The data link may be in accordance to one or more communications protocols. In some embodiments, the data link may be established at the transceiver 212A-N that found the signal 106A-N with the highest signal quality. In some embodiments, the data link may be established by a transceiver 212A-N different from the transceiver 212A-N that found the signal 106A-N with the highest signal quality. In some embodiments, the authenticator 220 may commence an authentication process with the identified ground station 102A-N. In some embodiments, the authenticator 220 may transmit an authentication message 110A-N to the identified ground station 102A-N. The authentication message 110A-N may include log-in information to establish communications between the ground station 102A-N and the avionics radio device 108. If an affirmative response permitting the communication is received from the ground station 102A-N, the authenticator 220 may commence the data link with the corresponding ground station 102A-N using one of the transceivers 212A-N. In some embodiments, the authenticator 220 may commence a data link in one communications protocol (e.g., voice mode) using one of the transceivers 212A-N and may commence a data link in another communications protocol (e.g., High Frequency Data Link (HFDL)) using another of the transceivers 212A-N.

In some embodiments, the authenticator 220 may update the list of frequencies (also referred to as the "best frequencies table") for the ground stations 102A-N (e.g., the first set of frequencies scanned by the first transceiver 212A) to include the frequency corresponding to the a signal 106A-N is identified as having the highest level of signal quality. In some embodiments, the list of frequencies may be stored on memory at the avionics radio device 108. As the first set of frequencies scanned by the first transceiver 212A may be different, or less in number, than the second set of frequencies scanned by the second transceiver 212B, addition of new frequencies into the first set of frequencies may further reduce the time in future scanning for frequencies for signals 106A-N from ground stations 102A-N.

Subsequent to and simultaneous with the commencement of the data link with one of the ground stations 102A-N, a subset of the transceivers 212A-N may continue to scan the sets of frequencies for signals 106A-N originating from the ground stations 102A-N via the antenna 204 in the manner described above. Another subset of the transceivers 212A-N may maintain the data link with the ground station 102A-N. In addition, the decoder 214 may continue to decode each signal 106A-N as received by the transceivers 212A-N. Furthermore, with the signal 106A-N decoded, the signal quality estimator 216 may continue to determine a signal quality metric for each signal 106A-N. The comparator 218 may continue to compare the signal quality of each signal 106A-N to one another.

The comparator 218 may also determine whether the signal quality of the signal 106A-N of the ground station 102A-N with which the radio device 108 is connected to has degraded to greater than or less than a predetermined threshold. The predetermined threshold may correspond to the level of signal quality to maintain stable connection between the avionics radio device 108 and the ground station 102A-N. The comparator 218 may determine whether the signal quality of other signals 106A-N from other ground stations 102A-N is above a predetermined floor. The predetermined floor may correspond to a minimum level of signal quality to maintain a stable connection between the avionics radio device 108 and the respective ground station 102A-N. If the comparator 218 determines that the signal quality of the signal 106A-N of the ground station 102A-N (e.g., first ground station 102A at $T_1$) with which the radio device 108 is connected to has degraded to less than the predetermined threshold, the authenticator 220 may terminate the data link with the respective ground station 102A-N. Based on the comparison of the signal quality of signals 106A-N from other ground stations 102A-N, the authenticator 220 may commence a data link with the ground station 102A-N with the signal 106A-N of the highest signal quality by sending an authentication message 110A-N using one of the transceivers 212A-N (e.g., second ground station 102B at $T_2$). The transceiver 212A-N used to commence the data link with the new ground station 102A-N may be the same as the transceiver 212A-N used with the previous ground station 102A-N with which the data link was terminated.

In some embodiments, the authenticator 220 may delay terminating the data link until the signal quality of other signals 106A-N from other ground stations 102A-N is above the predetermined floor. If the comparator 218 determines that the signal quality of the ground station 102A-N with which the radio device 108 is connected (e.g., first ground station 102A at $T_1$) to has degraded to less than the predetermined threshold and that the signal quality of other ground stations 102A-N is above the predetermined floor, the authenticator 220 may terminate the data link with the ground station 102A-N with which the radio device 108 is connected to. The authenticator 220 may then commence a data link with the ground station 102A-N with the signal 106A-N of the highest signal quality by sending an authentication message 110A-N using one of the transceivers 212A-N (e.g., second ground station 102B at $T_2$). The transceiver 212A-N used to commence the data link with the new ground station 102A-N may be the same as the transceiver 212A-N used with the previous ground station 102A-N with which the data link was terminated. In this manner, the transceivers 212A-N of the radio device 108 may scan frequencies for signals 106A-N from other ground stations 102A-N while the data link is handed off from one ground station 102A-N to another ground station 102A-N. Furthermore, handing off the data link from one ground station 102A-N to another ground station 102A-N may reduce the delay in availability or time latency performance.

Figure 3:
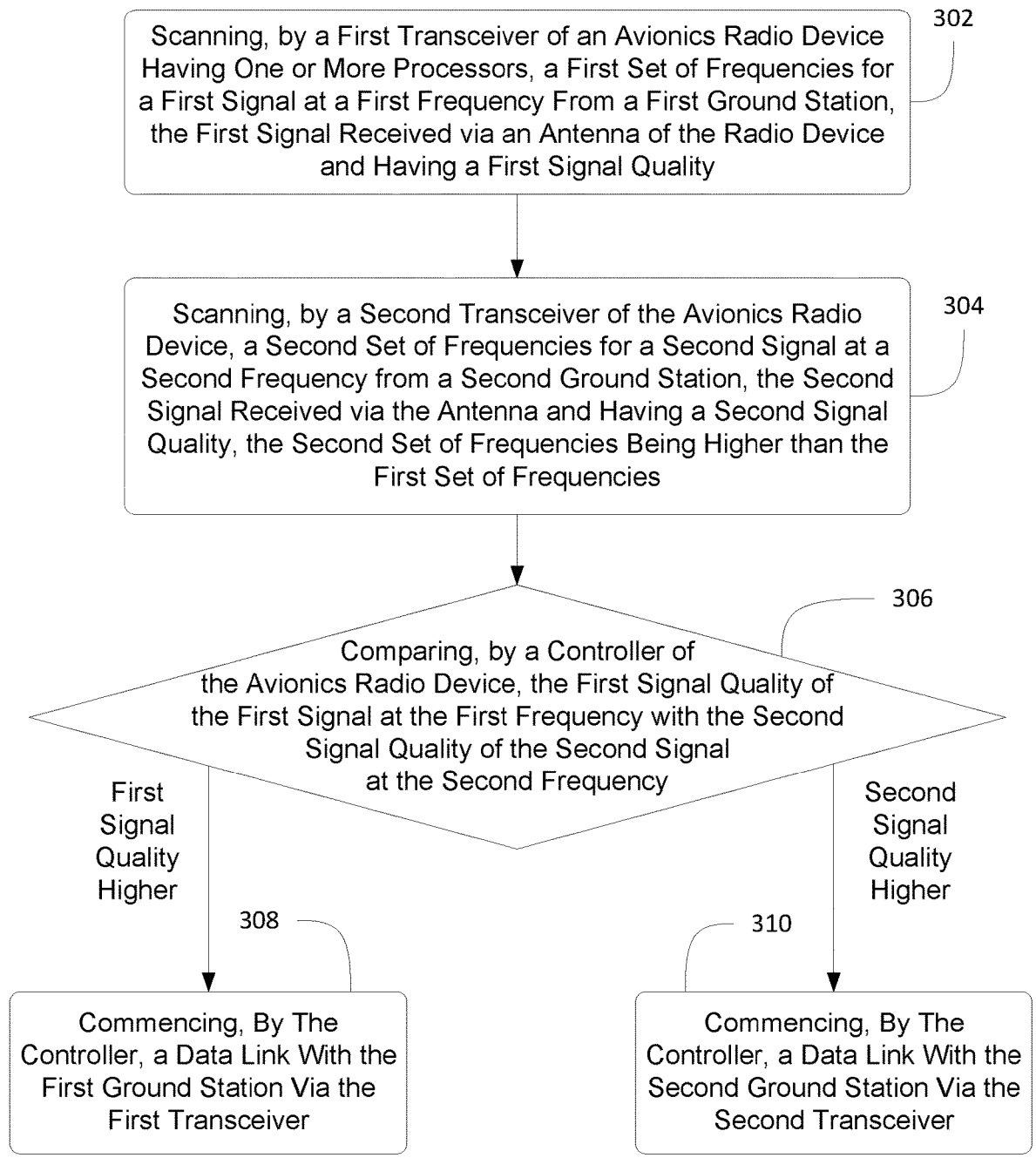
FIG. 3 shows a block diagram of an example embodiment of a method of data link acquisition using multichannel transceiver channels, in accordance with some embodiments of the inventive concepts disclosed herein.

Referring to FIG. 3, illustrated is a method 300 of data link acquisition using multichannel transceiver channels, in accordance with some embodiments of the inventive concepts disclosed herein. The functionalities of method 300 may be implemented by any of the computing devices and system architectures depicted in FIGS. 1 and 2. In brief summary, a first transceiver of an avionics radio device having one or more processors may scan a first set of frequencies for a first signal at a first frequency from a first ground station (302). A second transceiver of the avionics radio device may scan a second set of frequencies for a second signal at a second frequency from a second ground station (304). A controller of the avionics radio device may compare the first signal quality of the first signal at the first frequency with the second signal quality of the second signal at the second frequency (306). If the first signal quality is higher, the controller may commence a data link with the first ground station via the first transceiver (308). If the second signal quality is higher, the controller may commence a data link with the second ground station via the second transceiver (310).

In further detail, referring now to step 302, and in some embodiments, a first transceiver of an avionics radio device having one or more processors may scan a first set of frequencies for a first signal at a first frequency from a first ground station. The first signal may be received via an antenna of the avionics radio device and may have a first signal quality. The first transceiver may identify an amplitude of an input at the first frequency from the antenna of the avionics radio device. If the amplitude of the input from the antenna is above a predefined minimum, the first transceiver may determine or recognize an existence and/or quality of the first signal at the first frequency from the first ground station. On the other hand, if the amplitude is below the predefined minimum, the first transceiver may determine that the input is noise or too weak and may continue to scan the first set of frequencies for the first signal.

In further detail, referring now to step 304, and in some embodiments, a second transceiver of the avionics radio device may scan a second set of frequencies for a second signal at a second frequency from a second ground station. The second signal may be received via the antenna and may have a second signal quality. The second set of frequencies may be higher than the first set of frequencies. The second transceiver may identify an amplitude of an input at the second frequency from the antenna of the avionics radio device. If the amplitude of the input from the antenna is above a predefined minimum, the second transceiver may determine or recognize an existence and/or quality of the second signal at the second frequency from the second ground station. On the other hand, if the amplitude is below the predefined minimum, the second transceiver may determine that the input is noise or too weak and may continue to scan the second set of frequencies for the second signal.

In further detail, referring now to step 306, and in some embodiments, a controller of the avionics radio device may compare the first signal quality of the first signal at the first frequency with the second signal quality of the second signal at the second frequency. A signal processing unit of the avionics radio device may decode the first signal and the second signal in determining the first signal quality and the second signal quality. The signal processing unit may determine the first signal quality of the first signal and the second signal quality of the second signal, using various metrics such as signal-to-noise ratio (SNR), power, amplitude, and bit error rate, among others. Using the determination, the controller may compare the first signal quality to the second signal quality.

In further detail, referring now to step 308, and in some embodiments, if the first signal quality is higher, the controller may commence a data link with the first ground station via the first transceiver. The data link may be in accordance with one or more communications protocols. The controller may identify the first ground station as the origin of the first signal based on identifying information in the received first signal. The controller may transmit an authentication message via the first transceiver to commence the data link. The authentication message may include identifying information and/or login information such as credentials, of the avionics radio device. Once confirmation is received from the first ground station, the controller may continue communications with the first ground station.

Subsequent to and simultaneous with the commencement of the data link with the first ground station, the second transceiver may continue to scan the second set of frequencies for the second signal from the second ground station. The first transceiver may maintain the data link with the first ground station. The controller may continue to monitor the first signal quality and the second signal quality, and may compare the first signal quality with the second signal quality. If the first signal quality has degraded to less than a predetermined threshold, the controller may terminate the data link with the first ground station and commence a second data link with the second ground station.

In further detail, referring now to step 310, and in some embodiments, if the second signal quality is higher, the controller may commence a data link with the second ground station via the second transceiver. The data link may be in accordance with one or more communications protocols. The controller may identify the second ground station as the origin of the second signal based on identifying information in the received second signal. The controller may transmit an authentication message via the first transceiver to commence the data link. The authentication message may include identifying information and/or login information such as credentials, of the avionics radio device. Once confirmation is received from the second ground station, the controller may continue communications with the second ground station.

Subsequent to and simultaneous with the commencement of the data link with the second ground station, the first transceiver may continue to scan the first set of frequencies for the first signal from the first ground station. The second transceiver may maintain the data link with the second ground station. The controller may continue to monitor the first signal quality and the second signal quality, and may compare the first signal quality with the second signal quality. If the second signal quality has degraded to less than a predetermined threshold, the controller may terminate the data link with the second ground station and commence a second data link with the first ground station.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The inventive concepts disclosed herein contemplate methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for data link acquisition using multichannel transceiver channels, comprising:
    a first transceiver of an avionics radio device having one or more processors, configured to scan a first set of frequencies for a first signal at a first frequency from a first ground station, the first signal received via an antenna of the radio device and having a first signal quality;
    a second transceiver of the avionics radio device, configured to scan a second set of frequencies for a second signal at a second frequency from a second ground station, the second signal received via the antenna and having a second signal quality, the second set of frequencies being higher than the first set of frequencies; and
    a controller of the avionics radio device communicatively coupled to the first transceiver and the second transceiver, configured to:
        compare the first signal quality of the first signal at the first frequency with the second signal quality of the second signal at the second frequency, and
        commence a data link with the first ground station or the second ground station via a first one of the first and second transceivers of the avionics radio device based on the comparison between the first signal quality of the first signal and the second signal quality of the second signal.

2. The system of claim 1, wherein the controller is further configured to update, during the scanning by the first and second transceivers, a list of signals from a plurality of ground stations comprising the first and second ground stations, from which a signal with the highest level of signal quality from the scanning is identified.

3. The system of claim 1, wherein the controller is further configured to:
    determine, subsequent to the commencement of the data link with the first ground station, that the first signal quality has degraded to a level below a predetermined threshold; and
    terminate, responsive to the determination that the first signal quality has degraded to a level below the predetermined threshold, the data link with the first ground station.

4. The system of claim 3, wherein the controller is further configured to commence, responsive to the determination that the first signal quality has degraded to a level below that of the second signal quality, an authentication process with the second ground station.

5. The system of claim 1, wherein the first transceiver is further configured to scan each frequency of the first set of frequencies for a predetermined time window, the predetermined time window greater than a first transmission time window of the first signal from the first ground station or a second transmission time window of the second signal from the second ground station; and
    wherein the second transceiver is further configured to scan each frequency of the second set of frequencies for the predetermined time window.

6. The system of claim 1, wherein the controller is further configured to decode the first signal to determine the first signal quality and to decode the second signal to determine the second signal quality.

7. The system of claim 1, wherein the controller is further configured to commence the data link in a first communications protocol via a third transceiver of the radio device and to maintain a second data link in a second communications protocol via a fourth transceiver of the radio device.

8. The system of claim 1, wherein subsequent to the commencement of the data link with the first ground station, a second one of the first and second transceivers is further configured to scan the first set of frequencies, the second set of frequencies or a third set of frequencies, for a third signal from one of a plurality of ground stations comprising the first and second ground stations, the third signal received via the antenna and having a third signal quality.

9. The system of claim 1, further comprising a third transceiver of the avionics radio device, configured to maintain, during the scanning by the first and second transceivers, a voice communications link with one of a plurality of ground stations comprising the first and second ground stations, via the antenna.

10. An avionics radio device for data link acquisition using multichannel transceiver channels, comprising:
    a first transceiver configured to scan a first set of frequencies for a first signal at a first frequency from a first ground station, the first signal received via an antenna of the radio device and having a first signal quality;
    a second transceiver configured to scan a second set of frequencies for a second signal at a second frequency from a second ground station, the second signal received via the antenna and having a second signal quality, the second set of frequencies being higher than the first set of frequencies; and
    a controller communicatively coupled to the first transceiver and the second transceiver, configured to:
        compare the first signal quality of the first signal at the first frequency with the second signal quality of the second signal at the second frequency, and commence a data link with the first ground station or the second ground station via a first one of the first and second transceivers of the avionics radio device based on the comparison between the first signal quality of the first signal and the second signal quality of the second signal.

11. A method of data link acquisition using multichannel transceiver channels, comprising:
    scanning, by a first transceiver of an avionics radio device having one or more processors, a first set of frequencies for a first signal at a first frequency from a first ground station, the first signal received via an antenna of the radio device and having a first signal quality;
    scanning, by a second transceiver of the avionics radio device, a second set of frequencies for a second signal at a second frequency from a second ground station, the second signal received via the antenna and having a second signal quality, the second set of frequencies being higher than the first set of frequencies;
    comparing, by a controller of the avionics radio device, the first signal quality of the first signal at the first frequency with the second signal quality of the second signal at the second frequency; and
    commencing, by the controller, a data link with the first ground station or the second ground station via a first one of the first and second transceivers of the avionics radio device based on the comparison between the first signal quality of the first signal and the second signal quality of the second signal.

12. The method of claim 11, further comprising updating, by the controller, the first set of frequencies to include the second frequency responsive to a determination that the first signal quality is greater than the second signal quality.

13. The method of claim 11, further comprising:
    determining, by the controller, subsequent to the commencement of the data link with the first ground station, that the first signal quality has degraded to a level below a predetermined threshold; and
    terminating, by the controller, responsive to the determination that the first signal quality has degraded to a level below the predetermined threshold, the data link with the first ground station.

14. The method of claim 11, further comprising commencing, by the controller, responsive to the determination that the first signal quality has degraded to a level below that of the second signal quality, an authentication process with the second ground station.

15. The method of claim 11, further comprising:
    scanning, by the first transceiver, each frequency of the first set of frequencies for a predetermined time window, the predetermined time window greater than a first transmission time window of the first signal from the first ground station or a second transmission time window of the second signal from the second ground station; and
    scanning, by the second transceiver, each frequency of the second set of frequencies for the predetermined time window.

16. The method of claim 11, further comprising:
    decoding, by the controller, the first signal to determine the first signal quality; and
    decoding, by the controller, the second signal to determine the second signal quality.

17. The method of claim 11, further comprising:
    commencing, by the controller, the data link in a first communications protocol via a third transceiver of the radio device; and
    maintaining, by the controller, a second data link in a second communications protocol via a fourth transceiver of the radio device.

18. The method of claim 11, further comprising subsequent to the commencement of the data link with the first ground station, scanning, by one of the first or the second transceivers, the first set of frequencies, the second set of frequencies or a third set of frequencies, for a third signal from one of a plurality of ground stations comprising the first and second ground stations, the third signal received via the antenna and having a third signal quality.

19. The method of claim 11, further comprising maintaining, by a third transceiver of the avionics radio device, during the scanning by the first and second transceivers, a voice communications link with one of a plurality of ground stations comprising the first and second ground stations, via the antenna.

20. The method of claim 11, further comprising maintaining, by a fourth transceiver of the avionics radio device, during the scanning by the first and second transceivers, a second data link with a third ground station via the antenna.

* * * * *